W. G. SCHOENHUT.
DOLL.
APPLICATION FILED MAR. 18, 1919.

1,358,470. Patented Nov. 9, 1920.

Inventor:
William G. Schoenhut,
by his Attorneys.

UNITED STATES PATENT OFFICE.

WILLIAM G. SCHOENHUT, OF PHILADELPHIA, PENNSYLVANIA, ASSIGNOR TO THE A. SCHOENHUT COMPANY, OF PHILADELPHIA, PENNSYLVANIA, A CORPORATION OF PENNSYLVANIA.

DOLL.

1,358,470.      Specification of Letters Patent.      Patented Nov. 9, 1920.

Application filed March 18, 1919. Serial No. 283,344.

*To all whom it may concern:*

Be it known that I, WILLIAM G. SCHOENHUT, a citizen of the United States, residing in Philadelphia, Pennsylvania, have invented certain Improvements in Dolls, of which the following is a specification.

My invention relates to dolls, more particularly to the facial features of the heads of the same, and the object of my invention is to provide an improved form of eye representation. While my invention has been applied more particularly to the heads of wooden dolls of well known construction and with which I am very familiar, it may be applied to other forms of dolls' heads; such heads, including the wooden heads, being suitably shaped to the desired contour and being provided with eye sockets. After shaping, of course, the faces of such heads must receive the features—the eyes, the eyebrows and eyelashes, nostril indications, lips, &c.

Heretofore, in the delineation of the facial features of these wooden heads, as well as other forms of dolls' heads, the eyes have usually been painted in, and this method of delineation has produced a highly satisfactory result, excepting that it is a very tiresome and tedious operation and very hard upon the eyes of the artist. Difficulties attendant upon such method of procedure and the necessity for artistic accuracy have drawn my attention to the desirability of providing other means for effecting the placing of the eye that would be more or less mechanical, and yet would require considerable dexterity and accuracy of adjustment to secure the desired effect.

These and other features of my invention are more fully described hereinafter, reference being had to the accompanying drawings, in which.

Figure 1:
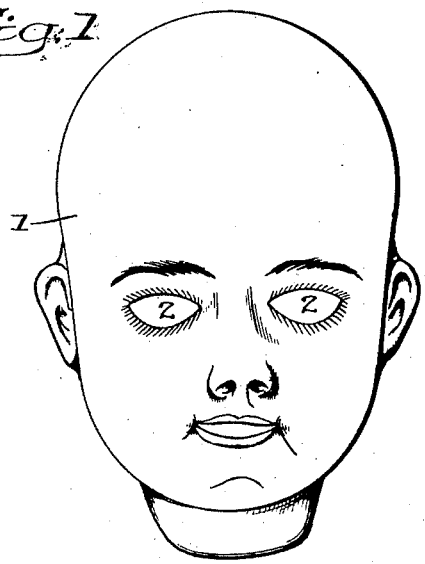
Figure 1, is a front elevation of a doll's head, which may be of any type and of any material, wood, plastic composition, vitreous material, papier-mâché or the like; the same being shown in a finished condition, except for the eyes.
Figure 2:
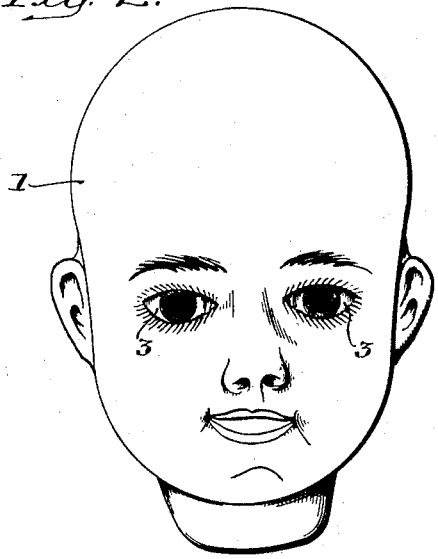
Fig. 2, is a similar view showing the eyes in position.

In Fig. 1, the head 1 is shown with the shaped eye sockets 2, ready to receive the eye representation constituting the subject of my invention. This eye representation is in the form of a decalcomania film 3 of the shape of the eye socket; such film having printed or otherwise mechanically produced thereon, by any process, a representation of the complete eye, constituting the ball, pupil, iris, cornea, &c. Such showing may be in any desired color normal to human eyes, and it may include the pink surface of the *caruncula lacrymalis*, adjacent the nose, displayed by the human eye.

The films 3 so prepared are carried upon a supporting medium—a sheet of paper 4, or the like—with a suitable adhesive body between the same and the film, preferably water-soluble.

In practice, in applying such eye representations, one of the eye films with a small portion of its support or backing is separated from a sheet of the same, then dipped in water, allowed to stand for a short while, and then applied to the eye socket of the doll's head and held in proper place by the finger while the paper or other support is slipped or pulled from beneath the same, whereupon the finger can press down the eye film upon the rounded surface of the eye socket, and the moistened adhesive previously holding the film to its backing will hold the same securely in place on the eye socket surface. The film, which is flexible, is then smoothed into position over the shaped ball by any suitable means; a camel's hair brush, for instance, and it may be subsequently varnished if desired; the varnish having the further effect of protecting the eye film and waterproofing the surface of the same.

Figure 3:
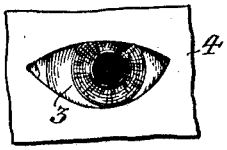
Fig. 3, is an enlarged view of a film upon which the eye is printed, which film is subsequently applied to an eye socket in the head of the doll.

It will be understood, of course, that the eye representations are made in rights and lefts; the single eye representation shown in Fig. 3, being the left eye.

I claim:

1. A doll's head having an eye member provided with a film of gelatinous character permanently affixed thereto and having thereon a printed finished simulation of the human eye.

2. A doll's head having a shaped eye member and a flexible transfer member of stretchable consistency readily conformable to said eye member and permanently attached thereto and bearing a printed finished representation of an eye.

3. A doll's head having a shaped eye member and a decalcomania film thereon of substantially the shape of the eye and having a printed simulation of the human eye.

4. A doll's head having its eyes each formed of an adhesively-supplied gelatinous film of oblong form having a printed representation of the human eye.

5. The method herein described of applying an eye to a doll's head, said method consisting, essentially, in previously preparing and adhesively attaching to a backing sheet, a film bearing a printed simulation of an eye; moistening the sheet to soften the adhesive which unites the film thereto; positioning the sheet with its loosened film relatively to a previously shaped eye member; separating the loosened film from its backing by a movement of one of these parts relatively to the other and applying the removed film to a previously shaped eye member by pressure.

6. The method herein described of applying an eye to a doll's head, said method consisting, essentially, in positioning relatively to a previously shaped eye member, an adhesively mounted backed and moistened transfer-film bearing a simulation of the human eye, and then removing the backing and directly affixing the moistened film to the previously shaped eye member by pressure.

7. The process of indicating eyes in dolls' heads, which consists in shaping the head with an eyeball socket having a suitable surface, providing a film of the shape of such socket and having the representation of an eye; said film being mounted upon a support or backing and secured thereto by a water soluble adhesive, wetting the backing to permit removal of the film therefrom, applying such film and backing in proper position over the surface of the eyeball socket, slipping the backing from beneath the film whereby the latter will be left in position over the surface of the eyeball socket, and smoothing the same into place; the adhesive originally connecting the film to its backing serving as the means whereby the film is attached in position in the doll's head.

8. The process of indicating eyes in dolls' heads, which consists in shaping the head with an eyeball socket having a suitable convex surface, providing a flexible film of the shape of such socket and having the representation of an eye printed thereon; said film being mounted upon a support or backing and secured thereto by a water soluble adhesive, wetting the backing to permit removal of the film therefrom, applying such film and backing in proper position over the convex surface of the eyeball socket, slipping the backing from beneath the film whereby the latter will be left in position over the surface of the eyeball socket, and smoothing the same into place; the adhesive originally connecting the film to its backing serving as the means whereby the film is attached in position in the doll's head.

9. The process of indicating eyes in dolls' heads, which consists in shaping the head with an eyeball socket having a suitable surface, providing a film of the shape of such socket and having the representation of an eye; said film being mounted upon a support or backing and secured thereto by a water soluble adhesive, wetting the backing to permit removal of the film therefrom, applying such film and backing in proper position over the surface of the eyeball socket, slipping the backing from beneath the film whereby the latter will be left in position over the surface of the eyeball socket, smoothing the same into place; the adhesive originally connecting the film to its backing serving as the means whereby the film is attached in position in the doll's head, and subsequently varnishing such film.

10. The process of indicating eyes in dolls' heads, which consists in shaping the head with an eyeball socket having a suitable convex surface, providing a flexible film of the shape of such socket and having the representation of an eye printed thereon; said film being mounted upon a support or backing and secured thereto by a water soluble adhesive, wetting the backing to permit removal of the film therefrom, applying such film and backing in proper position over the convex surface of the eyeball socket, slipping the backing from beneath the film whereby the latter will be left in position over the surface of the eyeball socket, smoothing the same into place; the adhesive originally connecting the film to its backing serving as the means whereby the film is attached in position in the doll's head, and subsequently varnishing such film.

11. The combination of a doll's head having an eye socket with shaped surface, of an eye representation in the form of a flexible film applied to such socket.

12. The combination of a doll's head having an eye socket with shaped surface, of an eye representation in the form of a flexible printed film applied to such socket.

WILLIAM G. SCHOENHUT.